United States Patent
Ishikawa et al.

(10) Patent No.: US 12,125,620 B2
(45) Date of Patent: Oct. 22, 2024

(54) ELECTROMAGNETIC STEEL SHEET

(71) Applicant: NISSAN MOTOR CO., LTD., Yokohama (JP)

(72) Inventors: Ichiro Ishikawa, Kanagawa (JP); Takeshi Noda, Kanagawa (JP); Kazuhiro Ogawa, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 329 days.

(21) Appl. No.: 17/634,321

(22) PCT Filed: Aug. 13, 2019

(86) PCT No.: PCT/JP2019/031854
§ 371 (c)(1),
(2) Date: Feb. 10, 2022

(87) PCT Pub. No.: WO2021/029014
PCT Pub. Date: Feb. 18, 2021

(65) Prior Publication Data
US 2022/0293312 A1    Sep. 15, 2022

(51) Int. Cl.
| | | |
|---|---|---|
| H01F 1/147 | (2006.01) | |
| C22C 38/02 | (2006.01) | |
| C22C 38/04 | (2006.01) | |
| C22C 38/06 | (2006.01) | |
| C22C 38/08 | (2006.01) | |
| C23C 8/32 | (2006.01) | |
| H01F 1/16 | (2006.01) | |

(52) U.S. Cl.
CPC ............ *H01F 1/147* (2013.01); *C22C 38/02* (2013.01); *C22C 38/04* (2013.01); *C22C 38/06* (2013.01); *C22C 38/08* (2013.01); *C23C 8/32* (2013.01); *H01F 1/16* (2013.01)

(58) Field of Classification Search
None
See application file for complete search history.

(56) References Cited

U.S. PATENT DOCUMENTS

| | | | | |
|---|---|---|---|---|
| 6,083,455 | A * | 7/2000 | Kurita | ........... C23C 8/26 |
| | | | | 148/318 |
| 2011/0041959 | A1* | 2/2011 | Mizuno | .......... C22C 38/04 |
| | | | | 148/318 |
| 2013/0180626 | A1* | 7/2013 | Yoshida | .......... C22C 38/42 |
| | | | | 148/318 |
| 2017/0016107 | A1* | 1/2017 | Umehara | .......... C21D 1/06 |
| 2018/0198352 | A1 | 7/2018 | Perry et al. | |

FOREIGN PATENT DOCUMENTS

| | | |
|---|---|---|
| CN | 104204269 A | 12/2014 |
| JP | 52-63814 A | 5/1977 |
| JP | 2004-256831 A | 9/2004 |
| JP | 2008-240104 A | 10/2008 |
| JP | 2011-132584 A | 7/2011 |

* cited by examiner

*Primary Examiner* — Seth Dumbris
(74) *Attorney, Agent, or Firm* — Foley & Lardner LLP

(57) ABSTRACT

An electrical steel sheet includes a main surface and an end surface. The electrical steel sheet includes a base material part and an end surface nitrided layer that is provided on the end surface in a manner adjacent to the base material part and that contains nitrogen. The end surface nitrided layer has a surface hardness of 430 HV or more and 1250 HV or less. The end surface contains nitrogen in an amount higher than a nitrogen concentration at the main surface.

20 Claims, 8 Drawing Sheets

ELECTROMAGNETIC STEEL SHEET

TECHNICAL FIELD

The present invention relates to an electrical steel sheet, and in more detail, relates to an electrical steel sheet applicable to a rotor of a driving motor mounted on an electric vehicle or the like.

BACKGROUND ART

High-strength non-oriented electrical steel sheets have been developed heretofore (refer to Patent Document 1). High-strength non-oriented electrical steel sheets have such high strength as to withstand high-speed rotation of rotors and have excellent magnetic properties. This high-strength non-oriented electrical steel sheet contains more than 0.0050 mass % and 0.020 mass % or less of C, 0.01 mass % or less of N, 0.030 mass % or less of the total of C and N, more than 4.0 mass % and 10.0 mass % or less of Si, 2.0 to 10.0 mass % of Cr, and 0.04 mass % or less of P. The high-strength non-oriented electrical steel sheet also contains Ti in an amount satisfying the formula (1): $-0.02 \leq Ti-4(C+N) \leq 0.04$, and the balance is Fe and inevitable impurities.

CITATION LIST

Patent Document

Patent Document 1: JP 2008-240104A

SUMMARY OF INVENTION

Technical Problem

The high-strength non-oriented electrical steel sheet disclosed in Patent Document 1 is strengthened by adding an alloying element to iron. Such a high-strength non-oriented electrical steel sheet is drastically reduced in magnetic properties, and specifically, iron loss is considerably increased.

The present invention has been made in view of these problems in existing techniques. An object of the present invention is to provide an electrical steel sheet having fatigue strength that is improved by 10% or more without drastically reducing magnetic properties.

Solution to Problem

The inventors of the present invention have conducted an intensive study in order to achieve the above object. As a result, they have found that providing a predetermined nitrided layer to an end surface of an electrical steel sheet enables achieving the above object. Thus, the present invention has been completed.

That is, the electrical steel sheet of the present invention includes a main surface and an end surface. The electrical steel sheet includes a base material part and an end surface nitrided layer that is provided on the end surface in a manner adjacent to the base material part and that contains nitrogen. The end surface nitrided layer has a surface hardness of 430 HV or more and 1250 HV or less. In one aspect, the electrical steel sheet includes an end surface nitrided layer that contains nitrogen at the whole end surface of the electrical steel sheet. In another aspect, the electrical steel sheet includes a base material part that is positioned on a center side of a plane direction of the main surface and that does not include a nitrided layer in the whole thickness direction of the electrical steel sheet, and the electrical steel sheet also includes an end surface nitrided layer that is provided on the whole end surface in a manner adjacent to the base material part and that includes a nitrided layer containing nitrogen in the whole thickness direction of the electrical steel sheet. In yet another aspect, the electrical steel sheet has a fatigue strength stress ratio of 1.11 to 1.41.

Advantageous Effects of Invention

In the present invention, a predetermined nitrided layer is provided on the end surface of the electrical steel sheet. This enables providing an electrical steel sheet that is improved in fatigue strength by 10% or more without drastically reducing magnetic properties.

DESCRIPTION OF EMBODIMENTS

Hereinafter, an electrical steel sheet according to embodiments of the present invention will be described in detail with reference to the figures. The dimensional ratio in the figures that are referred to in the following description may differ from an actual ratio due to exaggeration for convenience of explanation.

First Embodiment

Figure 1:
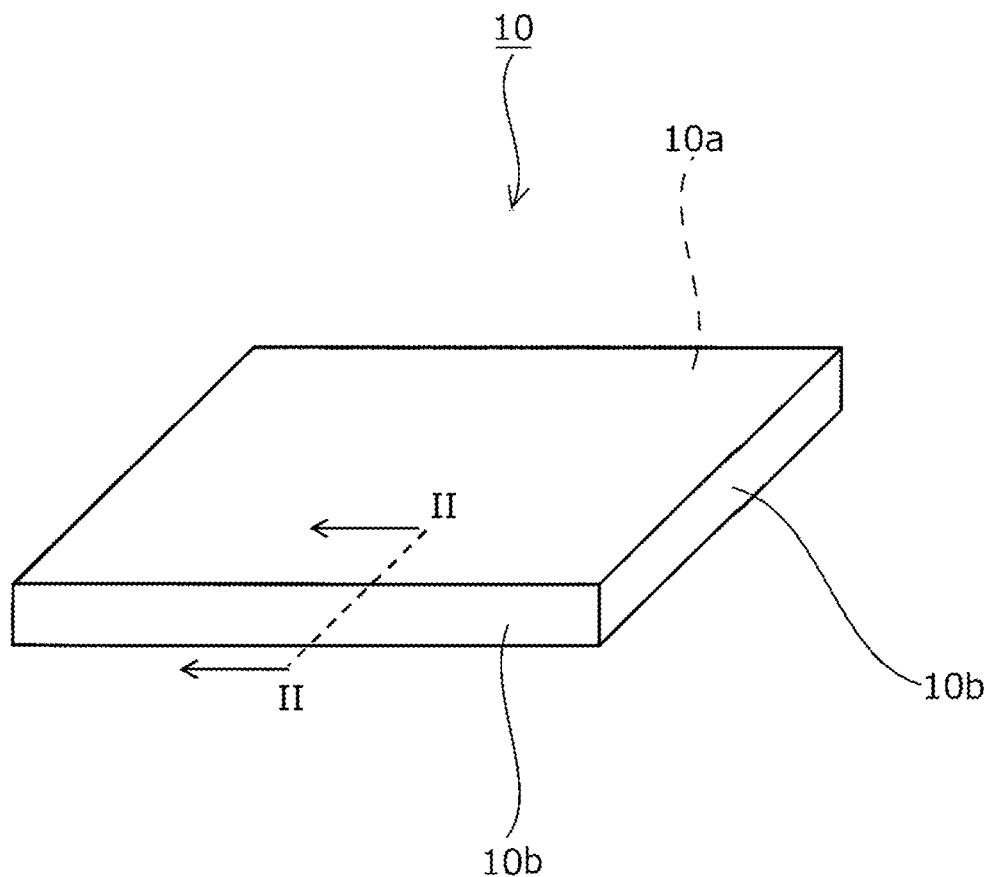
FIG. 1 is a schematic perspective view illustrating an electrical steel sheet according to a first embodiment.
Figure 2:
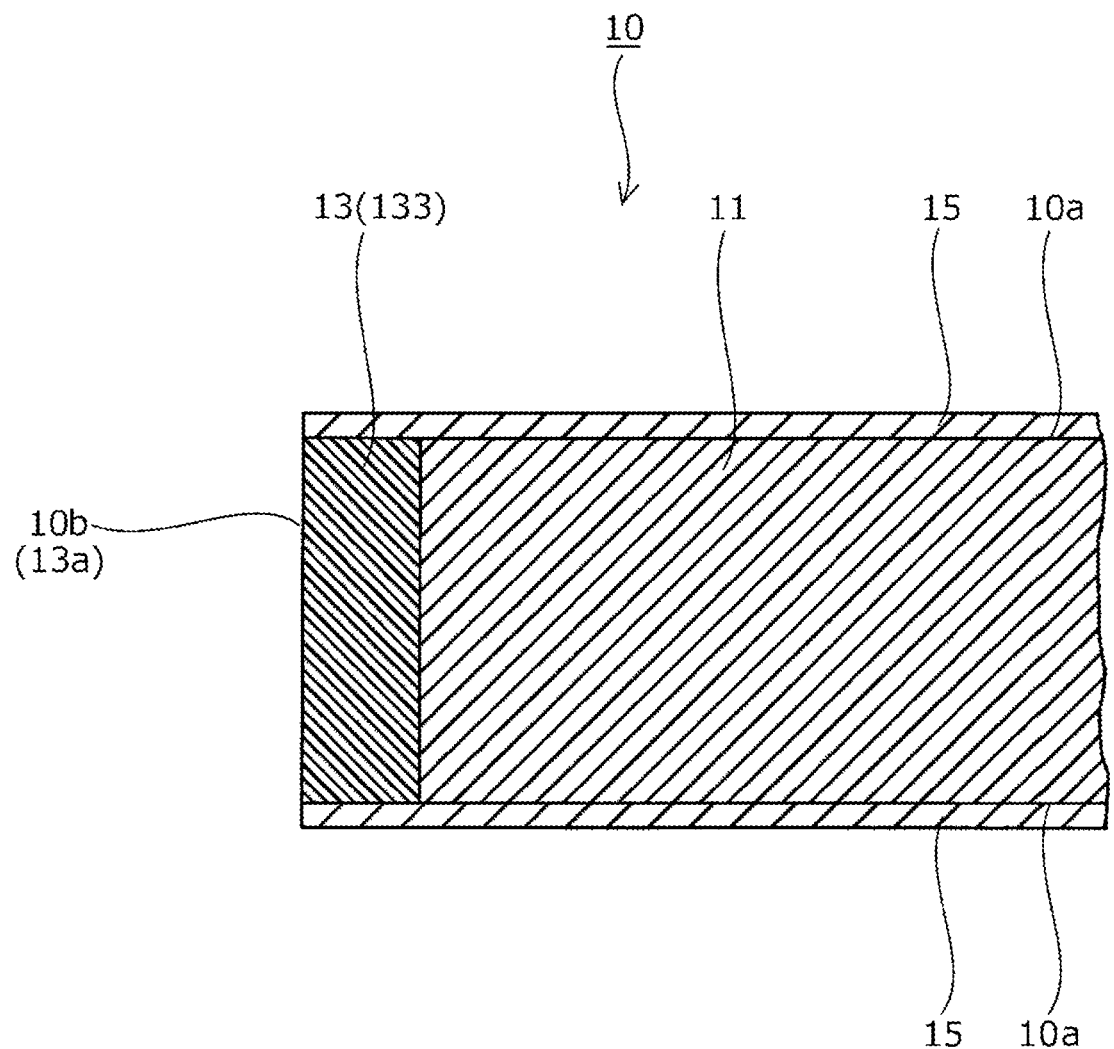
FIG. 2 is a schematic sectional view along a II-II line of the electrical steel sheet illustrated in FIG. 1.

First, an electrical steel sheet according to a first embodiment will be described in detail. FIG. 1 is a schematic perspective view illustrating an electrical steel sheet according to the first embodiment. FIG. 2 is a schematic sectional view along a II-II line of the electrical steel sheet illustrated in FIG. 1.

As illustrated in FIG. 1, an electrical steel sheet 10 of the first embodiment has a main surface 10a and end surfaces 10b. As illustrated in FIG. 2, the electrical steel sheet 10 includes a base material part 11 and an end surface nitrided layer 13 that is provided on the end surface 10b in a manner adjacent to the base material part. In particular, the electrical steel sheet 10 preferably includes, but not limited to, insulating films 15 respectively formed on the main surfaces 10a of the electrical steel sheet, as illustrated in FIG. 2. Although not illustrated in the figure, the end surface nitrided layer contains nitrogen. Although not illustrated in the figure, the end surface nitrided layer has a surface hardness of 430 HV or more and 1250 HV or less.

Herein, the "end surface" of this application means an end surface that is processed into a shape according to a part shape or the purpose of use.

As described above, in the electrical steel sheet of the first embodiment, the end surface nitrided layer, which is provided on the end surface of the electrical steel sheet, has a surface hardness of 430 HV or more and 1250 HV or less. Thus, fatigue strength of the electrical steel sheet is improved by 10% or more without drastically reducing magnetic properties of the electrical steel sheet.

An end surface nitrided layer having a surface hardness of less than 430 HV hardly improves fatigue strength of the electrical steel sheet by 10% or more. An end surface nitrided layer having a surface hardness of more than 1250 HV drastically reduces magnetic properties of the electrical steel sheet. More specifically, an end surface nitrided layer having a surface hardness of more than 1250 HV drastically increases iron loss of the electrical steel sheet.

The "surface hardness of the end surface nitrided layer" in the present application is measured in conformity with Japanese Industrial Standards "Vickers hardness test—Test method" (JIS Z 2244). However, as to an end surface having a shear surface, which will be detailed later, this measurement is performed on an area of the shear surface.

The above-described effects are currently considered to be obtained by the following reasons.

Gas nitrocaburizing or oxynitriding is performed on an end surface of an electrical steel sheet by controlling used gas, processing temperature, and processing time. Nitrogen diffuses from the end surface of the electrical steel sheet, whereby an end surface nitrided layer containing nitrogen and having a surface hardness of 430 HV or more and 1250 HV or less is produced on the electrical steel sheet. This improves fatigue strength in the vicinity of the end surface of the electrical steel sheet that may become a start point of fatigue fracture.

The gas to be used in gas nitrocaburizing is not specifically limited, but for example, ammonia ($NH_3$)/carbon dioxide ($CO_2$) is preferably used. The processing temperature of gas nitrocaburizing is not specifically limited, but for example, 490° C. or higher and 560° C. or lower is preferable, and 500° C. or higher and 540° C. or lower is more preferable. The processing time of gas nitrocaburizing is not specifically limited, but for example, 0.5 hours or longer and 4 hours or shorter is preferable, 0.5 hours or longer and 3.5 hours or shorter is more preferable, 1 hour or longer and 3 hours or shorter is further preferable, and 1 hour or longer and 2.5 hours or shorter is particularly preferable.

The gas to be used in oxynitriding is not specifically limited, but for example, ammonia ($NH_3$)/air is preferably used. The processing temperature of oxynitriding is not specifically limited, but for example, 450° C. or higher and 480° C. or lower is preferable, 455° C. or higher and 465° C. or lower is more preferable, and 460° C. or higher and 465° C. or lower is further preferable. The processing time of oxynitriding is not specifically limited, but for example, 0.5 hours or longer and 4 hours or shorter is preferable, 1 hour or longer and 3.5 hours or shorter is more preferable, 1.5 hours or longer and 3.5 hours or shorter is further preferable, and 1.5 hours or longer and 3 hours or shorter is particularly preferable.

It goes without saying that if the above-described effects are obtained due to other causes, they are still included in the scope of the present invention.

In the present application, for example, an iron loss ($W_{15/50}$) and an iron loss ($W_{10/400}$) are measured as magnetic properties. The "$W_{15/50}$" means an iron loss per 1 kg of an electrical steel sheet at a maximum magnetic flux density of 1.5 T and a frequency of 50 Hz. The "$W_{10/400}$" means an iron loss per 1 kg of an electrical steel sheet at a maximum magnetic flux density of 1.0 T and a frequency of 400 Hz. In the present application, the phrase "drastically increase iron loss" means that the iron loss of a gas nitrocarburized or oxynitrided electrical steel sheet increases by more than 60% relative to an electrical steel sheet not subjected to the gas nitrocaburizing or the oxynitriding described above. In other words, in the present application, the phrase "drastically increase iron loss" means that ratios of iron losses ($W_{15/50}$ and $W_{10/400}$) between a gas nitrocarburized or oxynitrided electrical steel sheet and an electrical steel sheet not subjected to the gas nitrocaburizing or the oxynitriding described above, exceed 1.60.

Further details of each constituent component will be described.

The composition of the electrical steel sheet 10 is not specifically limited. However, for example, it is preferable to use an electrical steel sheet consisting of 2.0 mass % or more and 4.0 mass % or less of silicon (Si), 0.15 mass % or more and 2.00 mass % or less of aluminum (Al), 0.10 mass % or more and 2.00 mass % or less of manganese (Mn), 0.01 mass % or more and 3.0 mass % or less of nickel (Ni), and the balance of iron (Fe) and inevitable impurities. The thickness of the electrical steel sheet 10 is not specifically limited, but for example, 0.5 mm or less is preferable, 0.15 mm or more and 0.5 mm or less is more preferable, and 0.15 mm or more and 0.35 mm or less is further preferable.

The kind of the end surface 10b is not specifically limited, but for example, a cut end surface is preferable.

An example of the cut end surface includes a cut end surface produced by a wire-cut electric discharge machine. Although not specifically limited, a cut end surface that is produced by a wire-cut electric discharge machine may be lapped additionally. An end surface having a cut end surface that is produced by a wire-cut electric discharge machine tends to not increase iron loss of an electrical steel sheet, compared with an end surface having a punched end surface that includes at least a shear surface produced by a pressing machine. The punched end surface will be detailed later. Meanwhile, an end surface having a punched end surface provides a high productivity in mass production of an electrical steel sheet having an end surface, compared with an end surface having a cut end surface produced by a wire-cut electric discharge machine.

The kind of the end surface nitrided layer 13 is not specifically limited on the condition that it has a surface hardness of 430 HV or more and 1250 HV or less. However, for example, an end surface nitrided layer that is formed by gas nitrocaburizing or oxynitriding an end surface of the electrical steel sheet is preferable.

The base material part 11 is a part in the state as it is rolled into a predetermined thickness according to a part shape or the purpose of use, where the composition of the base material part is not changed by processing such as the gas nitrocaburizing or the oxynitriding, or where not deformed by processing such as punching. In addition, the base material part is positioned on a center side in a plane direction of the main surface.

The kind of the insulating film 15 is not specifically limited on the condition that it has electrical insulating properties, but for example, it is preferable to use an insulating film that is made of a conventionally known inorganic material or organic material, or a mixture of them. It goes without saying that an electrical steel sheet without the insulating film 15 is also included in the scope of the present invention.

In the electrical steel sheet 10, the nitrogen concentration at the end surface is preferably higher than that at the main surface.

The electrical steel sheet includes an end surface having a nitrogen concentration higher than the nitrogen concentration at the main surface and also includes an end surface nitrided layer having a surface hardness of 430 HV or more and 1250 HV or less. Thus, reduction in magnetic properties of the electrical steel sheet is further suppressed, and fatigue strength of the electrical steel sheet is improved by 10% or more. Moreover, the electrical steel sheet is hardly distorted.

In the present application, the magnitude relationship between the "nitrogen concentration at the end surface" and the "nitrogen concentration at the main surface" can be determined by measuring a nitrogen distribution in a cross section along a thickness direction of an electrical steel sheet, in electron probe micro analysis. Specifically, the "nitrogen concentration at the main surface" is measured at a position of 500 μm depth from an end surface in the depth direction of an end surface nitrided layer.

In the electrical steel sheet 10, a ratio of a hardness at a position of 40 μm depth from a surface 13a of the end surface nitrided layer 13 in a cross section along the depth direction (shown by the arrow Z in FIG. 2) of the end surface nitrided layer 13, to a surface hardness of the end surface nitrided layer 13, is preferably 80% or less.

In the present application, the "hardness at a position of 40 μm depth from the surface of the end surface nitrided layer in a cross section" is measured in conformity with Japanese Industrial Standards "Vickers hardness test—Test method" (JIS Z 2244). In measuring the hardness in a cross section, the cross section is mirror polished. As to an end surface having a shear surface, which will be detailed later, this measurement is performed on the area of the shear surface.

In the electrical steel sheet having the above ratio of 80% or less, a diffusion range of nitrogen that improves fatigue strength, in other words, a hardness increased range, is narrow. This further suppresses reduction in magnetic properties of the electrical steel sheet and improves fatigue strength of the electrical steel sheet by 10% or more. In particular, in such an electrical steel sheet, it is possible to suppress increases in iron losses ($W_{15/50}$ and $W_{10/400}$) of the electrical steel sheet to be 10% or less and to improve fatigue strength of the electrical steel sheet by 10% or more.

In the electrical steel sheet 10, the surface hardness of the end surface nitrided layer 13 is preferably 550 HV or more and is more preferably 550 HV or more and 950 HV or less.

In the electrical steel sheet including an end surface nitrided layer having a surface hardness of 550 HV or more, reduction in magnetic properties of the electrical steel sheet is further suppressed, and fatigue strength of the electrical steel sheet is improved by 10% or more. In particular, in such an electrical steel sheet, it is possible to suppress increases in iron losses ($W_{15/50}$ and $W_{10/400}$) of the electrical steel sheet to be 10% or less and to improve fatigue strength of the electrical steel sheet by 10% or more.

In the electrical steel sheet 10, a distance from the surface 13a of the end surface nitrided layer 13 to a point having a Vickers hardness higher than that of the base material part 11 by 50 in the depth direction of the end surface nitrided layer 13, is preferably 0.07 mm or longer and is more preferably 0.07 mm or longer and 0.14 mm or shorter.

In the present application, the "distance from the surface of the end surface nitrided layer to a point having a Vickers hardness higher than that of the base material part by 50 in the depth direction of the end surface nitrided layer" may be referred to as a "practical depth of the nitrided layer". The "practical depth of the nitrided layer" is measured in conformity with Japanese Industrial Standards "Method of measuring nitrided case depth for iron and steel" (JIS G 0562). However, as to an end surface having a shear surface, which will be detailed later, this measurement is performed on the area of the shear surface.

In the electrical steel sheet having a practical depth of the nitrided layer of 0.07 mm or more, reduction in magnetic properties of the electrical steel sheet is further suppressed, and fatigue strength of the electrical steel sheet is improved by 10% or more. In particular, in such an electrical steel sheet, it is possible to suppress increases in iron losses ($W_{15/50}$ and $W_{10/400}$) of the electrical steel sheet to 10% or less and to improve fatigue strength of the electrical steel sheet by 10% or more.

It is preferable that the end surface nitrided layer 13 is composed of a diffusion layer 133 in the electrical steel sheet 10. In other words, in the electrical steel sheet, the end surface nitrided layer preferably does not have a compound layer containing iron nitride compounds and iron carbonitride compounds. The end surface nitrided layer without the compound layer does not increase notch sensitivity, resulting in improvement in fatigue strength of the electrical steel sheet. Examples of the iron nitride compound include $\gamma'$-$Fe_4N$, $\varepsilon$-$Fe_2N$, and $\varepsilon$-$Fe_3N$.

Existence of the compound layer can be determined by observing a cross section with the use of a scanning electron microscope and then analyzing elements in energy dispersive X-ray spectroscopy.

In the electrical steel sheet including an end surface nitrided layer composed of a diffusion layer, reduction in magnetic properties of the electrical steel sheet is further suppressed, and fatigue strength of the electrical steel sheet is improved by 10% or more. In particular, in such an electrical steel sheet, it is possible to suppress increases in iron losses ($W_{15/50}$ and $W_{10/400}$) of the electrical steel sheet to 10% or less and to improve fatigue strength of the electrical steel sheet by 10% or more.

In the electrical steel sheet 10, the thickness of the electrical steel sheet at the end surface nitrided layer is preferably equal to or less than that at the base material part and is more preferably less than that at the base material part. In general, a core of a rotor is formed by laminating electrical steel sheets. For this reason, having the above-described thickness relationship is suitable for such application.

Second Embodiment

Figure 3:
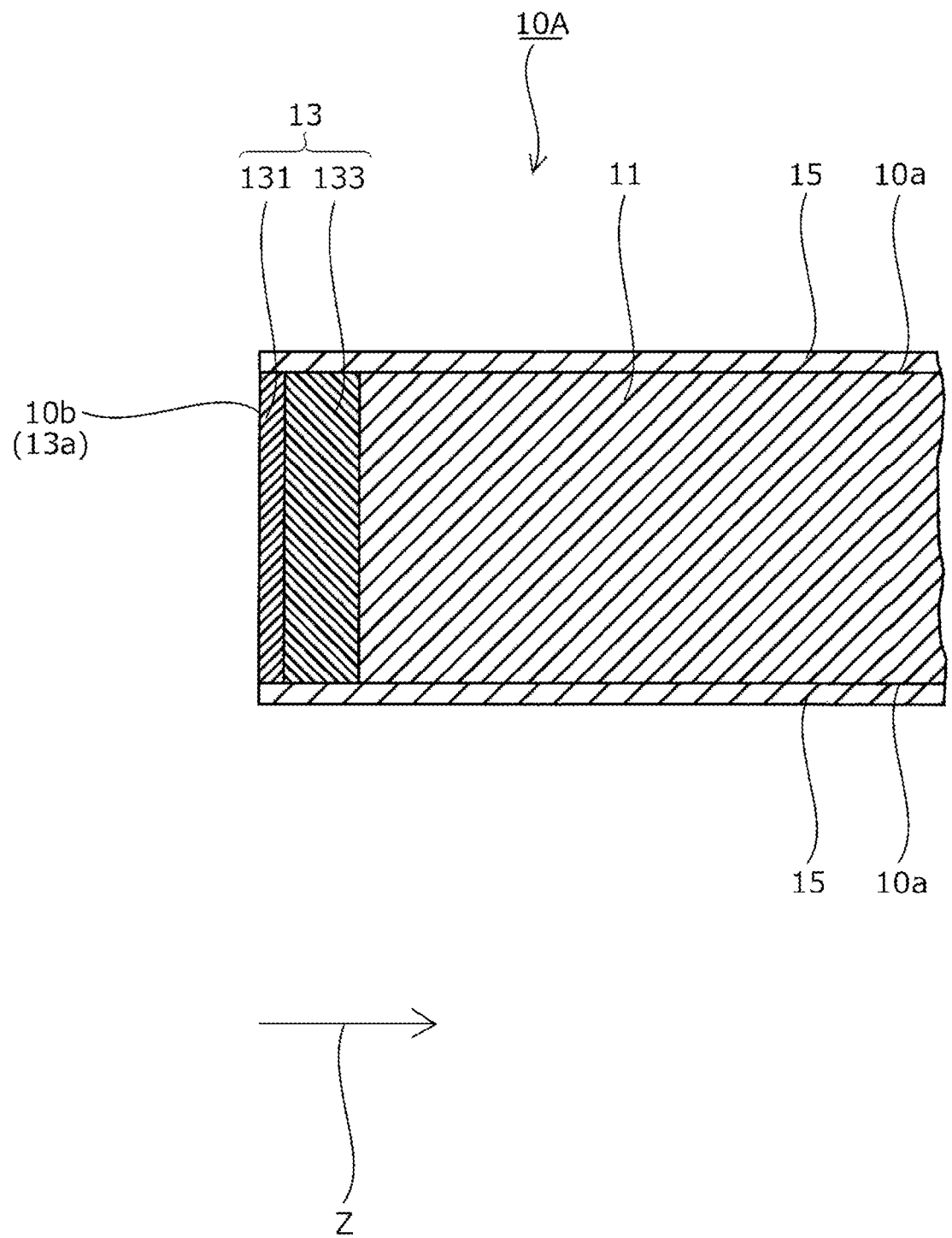
FIG. 3 is a schematic sectional view illustrating a main part of an electrical steel sheet according to a second embodiment.

Next, an electrical steel sheet according to a second embodiment will be described in detail. FIG. 3 is a schematic sectional view illustrating a main part of the electrical steel sheet according to the second embodiment. FIG. 3 is a schematic sectional view of the same part as the part shown by the II-II line in FIG. 1, of the electrical steel sheet according to the second embodiment. Note that constituent components equivalent to those described in the foregoing embodiment are denoted by the same reference signs, and descriptions thereof are omitted.

As illustrated in FIG. 3, an electrical steel sheet 10A of the second embodiment differs from the electrical steel sheet 10 of the first embodiment in that the end surface nitrided layer 13 includes a compound layer 131 and a diffusion layer 133.

As described above, in the electrical steel sheet of the second embodiment, the end surface nitrided layer, which is provided on the end surface of the electrical steel sheet, has a surface hardness of 430 HV or more and 1250 HV or less. Thus, fatigue strength is improved by 10% or more without drastically reducing magnetic properties. The electrical steel sheet of the second embodiment has the end surface nitrided layer that includes a compound layer and a diffusion layer. In such an electrical steel sheet, reduction in magnetic properties is further suppressed, and fatigue strength is improved by 10% or more.

Further details of the compound layer will be described.

An example of the compound layer 131 includes a compound layer containing iron nitride compounds and iron carbonitride compounds. Examples of the iron nitride compound include $\gamma'$-$Fe_4N$, $\varepsilon$-$Fe_2N$, and $\varepsilon$-$Fe_3N$.

Such a compound layer has high hardness and is thus generally effective for improving fatigue strength of electrical steel sheets.

The electrical steel sheet 10A of the second embodiment can employ the preferred embodiments described above in relation to the electrical steel sheet 10 of the first embodiment, as desired.

Third Embodiment

Figure 4:
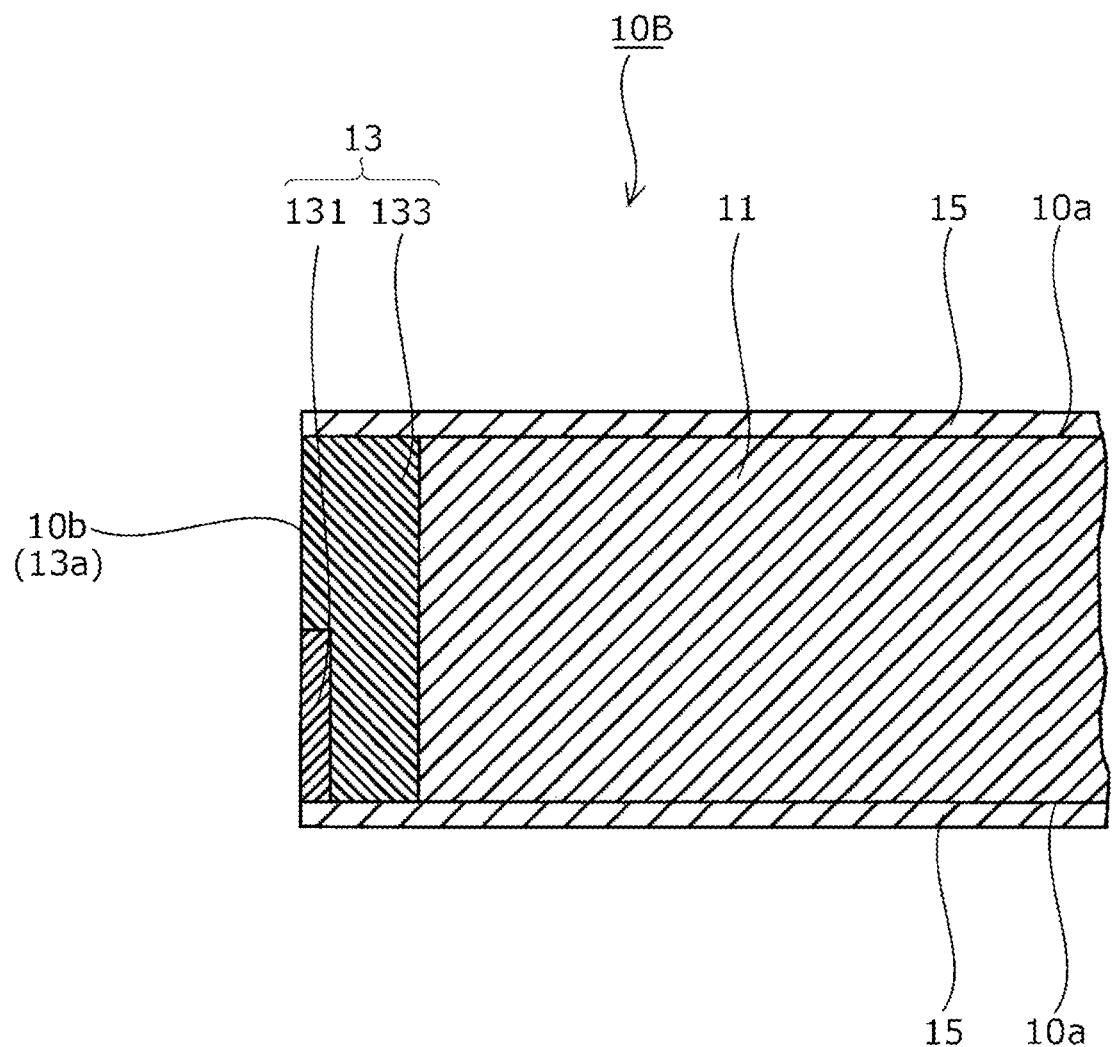
FIG. 4 is a schematic sectional view illustrating a main part of an electrical steel sheet according to a third embodiment.

Next, an electrical steel sheet according to a third embodiment will be described in detail. FIG. 4 is a schematic sectional view illustrating a main part of the electrical steel sheet according to the third embodiment. FIG. 4 is a schematic sectional view of the same part as the part shown by the II-II line in FIG. 1, of the electrical steel sheet of the third embodiment. Note that constituent components equivalent to those described in the foregoing embodiments are denoted by the same reference signs, and descriptions thereof are omitted.

As illustrated in FIG. 4, an electrical steel sheet 10B of the third embodiment differs from the electrical steel sheet 10A of the second embodiment in that the ratio of the compound layer 131 on the surface 13a of the end surface nitrided layer 13 is 50% or less.

As described above, in the electrical steel sheet of the third embodiment, the end surface nitrided layer, which is provided on the end surface of the electrical steel sheet, has a surface hardness of 430 HV or more and 1250 HV or less. Thus, fatigue strength is improved by 10% or more without drastically reducing magnetic properties. The electrical steel sheet of the third embodiment has the end surface nitrided layer that includes a compound layer and a diffusion layer. In such an electrical steel sheet, reduction in magnetic properties is further suppressed, and fatigue strength is improved by 10% or more. Moreover, in the electrical steel sheet of the third embodiment, the ratio of the compound layer on the surface of the end surface nitrided layer is 50% or less, preferably 40% or less, more preferably 30% or less, further preferably 20% or less, and particularly preferably 10% or less. In such an electrical steel sheet, reduction in magnetic properties of the electrical steel sheet is further suppressed, and fatigue strength of the electrical steel sheet is improved by 10% or more.

The "ratio of the compound layer on the surface of the end surface nitrided layer" in the present application means a ratio of a length of an outline defining the surface of the compound layer to a length of an outline defining the surface of the end surface nitrided layer at the end surface observed in a cross section along the thickness direction of the electrical steel sheet.

The compound layer, which has high hardness as described above, is generally effective for improving fatigue strength of electrical steel sheets. On the other hand, the compound layer is brittle and tends to generate a crack due to repetition of input. A crack that is generated by repetition of input becomes a starting point of crack gradual propagation and causes fatigue fracture. The cross section at a crack propagation part has a reduced remaining cross sectional area, and thus, stress applied to the cross section increases accordingly. Due to the thin thickness of the electrical steel sheet, the cross section at the crack propagation part is susceptible to an increase in stress, and stress exceeds yield strength of the material from an initial stage to an intermediate stage of crack generation. Thus, the number of times of repetition from crack generation to fracture tends to be small. From the point of view of reducing this effect, a smaller ratio of the compound layer on the surface of the end surface nitrided layer is more preferable.

The electrical steel sheet 10B of the third embodiment can employ the preferred embodiments described above in relation to the electrical steel sheet 10 of the first embodiment or the electrical steel sheet 10A of the second embodiment, as desired.

Fourth Embodiment

Figure 5:
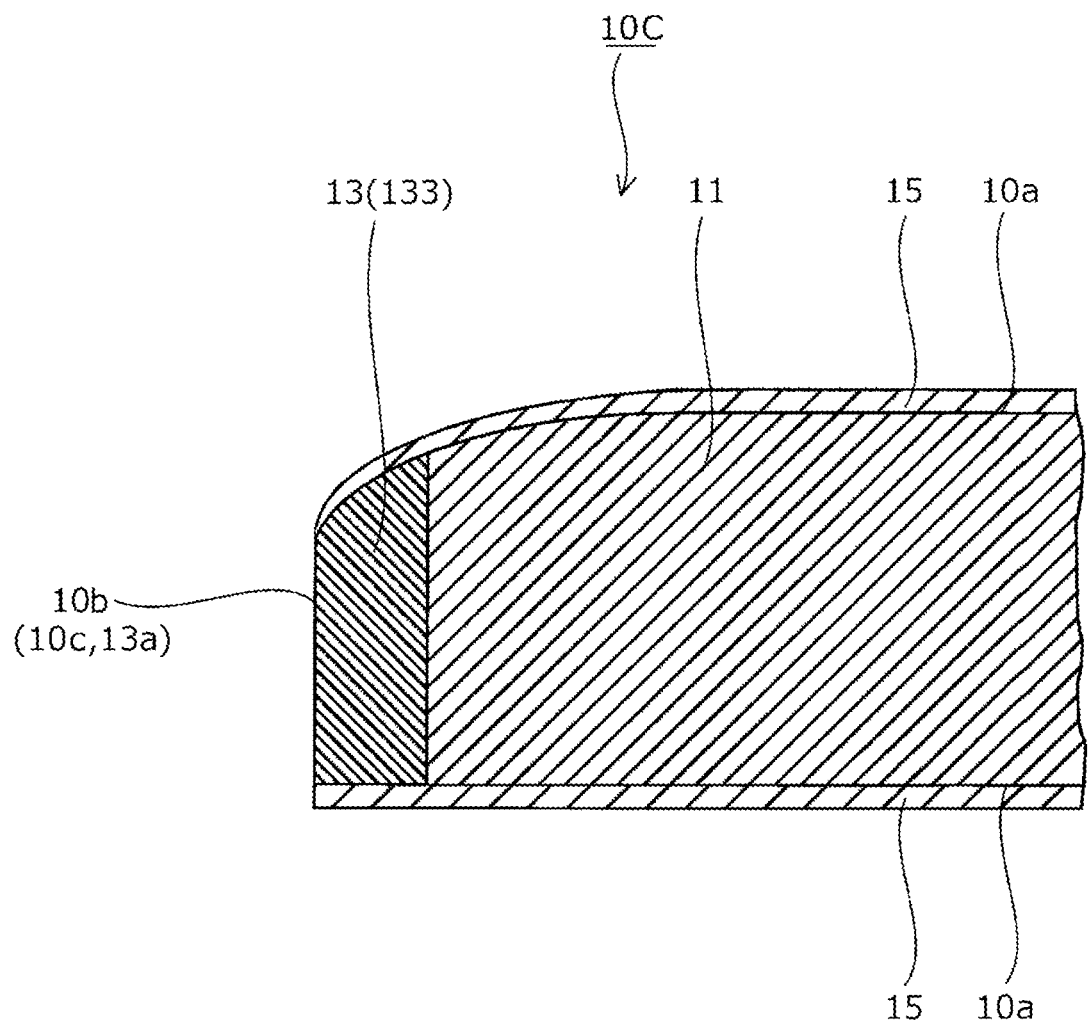
FIG. 5 is a schematic sectional view illustrating a main part of an electrical steel sheet according to a fourth embodiment.

Next, an electrical steel sheet according to a fourth embodiment will be described in detail. FIG. 5 is a schematic sectional view illustrating a main part of the electrical steel sheet according to the fourth embodiment. FIG. 5 is a schematic sectional view of the same part as the part shown by the line in FIG. 1, of the electrical steel sheet of the fourth embodiment. Note that constituent components equivalent to those described in the foregoing embodiments are denoted by the same reference signs, and descriptions thereof are omitted.

As illustrated in FIG. 5, an electrical steel sheet 10C of the fourth embodiment differs from the electrical steel sheet 10 of the first embodiment in that the end surface 10b includes a shear surface 10c.

As described above, in the electrical steel sheet of the fourth embodiment, the end surface nitrided layer, which is provided on the end surface of the electrical steel sheet, has a surface hardness of 430 HV or more and 1250 HV or less. Thus, fatigue strength is improved by 10% or more without drastically reducing magnetic properties. The electrical steel sheet of the fourth embodiment has the end surface that includes a shear surface. In such an electrical steel sheet, reduction in magnetic properties is further suppressed, and fatigue strength is improved by 10% or more.

Further details of the shear surface will be described.

As described above, the kind of the end surface 10b is not specifically limited, but for example, a cut end surface is preferable.

For example, the cut end surface is preferably a punched end surface that is produced by a pressing machine. The punched end surface includes at least a shear surface 10c. Forming the end surface nitrided layer within a deformed part of the punched end surface, in other words, within a part formed with a rollover, further suppresses reduction in magnetic properties.

In the electrical steel sheet 10C, the nitrogen concentration at the end surface is preferably higher than that at the main surface.

The electrical steel sheet includes an end surface having a nitrogen concentration higher than the nitrogen concentration at the main surface and also includes an end surface nitrided layer having a surface hardness of 430 HV or more and 1250 HV or less. Thus, reduction in magnetic properties of the electrical steel sheet is further suppressed, and fatigue strength of the electrical steel sheet is improved by 10% or more. Moreover, the electrical steel sheet is hardly distorted. The electrical steel sheet on the main surface side may be nitrided until around the part deformed by a pressing machine.

In the electrical steel sheet 10C, a ratio of the hardness at a position of 40 μm depth from the surface 13a of the end surface nitrided layer 13 in a cross section along the depth direction (shown by the arrow Z in FIG. 5) of the end surface nitrided layer 13, to the surface hardness of the end surface nitrided layer 13, is preferably 80% or less.

In the electrical steel sheet having the above ratio of 80% or less, a diffusion range of nitrogen that improves fatigue strength, in other words, a hardness increased range, is narrow. This further suppresses reduction in magnetic properties of the electrical steel sheet and improves fatigue strength of the electrical steel sheet by 15% or more. In particular, in such an electrical steel sheet, it is possible to suppress increases in iron losses ($W_{15/50}$ and $W_{10/400}$) of the electrical steel sheet to 10% or less and to improve fatigue strength of the electrical steel sheet by 15% or more.

In the electrical steel sheet 10C, the surface hardness of the end surface nitrided layer 13 is preferably 550 HV or more and is more preferably 550 HV or more and 950 HV or less.

In the electrical steel sheet including an end surface nitrided layer having a surface hardness of 550 HV or more, reduction in magnetic properties of the electrical steel sheet is further suppressed, and fatigue strength of the electrical steel sheet is improved by 10% or more. In particular, in such an electrical steel sheet, it is possible to suppress increases in iron losses ($W_{15/50}$ and $W_{10/400}$) of the electrical steel sheet to 10% or less and to improve fatigue strength of the electrical steel sheet by 15% or more.

In the electrical steel sheet including the end surface nitrided layer having a surface hardness of 550 HV or more and 950 HV or less, reduction in magnetic properties of the electrical steel sheet is further suppressed, and fatigue strength of the electrical steel sheet is improved by 30% or more. In particular, in such an electrical steel sheet, it is possible to suppress increases in iron losses ($W_{15/50}$ and $W_{10/400}$) of the electrical steel sheet to 10% or less and to improve fatigue strength of the electrical steel sheet by 30% or more.

In the electrical steel sheet 10C, a distance from the surface 13a of the end surface nitrided layer 13 to a point having a Vickers hardness higher than that of the base material part 11 by 50 in the depth direction of the end surface nitrided layer 13, is preferably 0.07 mm or longer and is more preferably 0.07 mm or longer and 0.14 mm or shorter.

In the electrical steel sheet having a practical depth of the nitrided layer of 0.07 mm or more, reduction in magnetic properties of the electrical steel sheet is further suppressed, and fatigue strength of the electrical steel sheet is improved by 10% or more. In particular, in such an electrical steel sheet, it is possible to suppress increases in iron losses ($W_{15/50}$ and $W_{10/400}$) of the electrical steel sheet to 10% or less and to improve fatigue strength of the electrical steel sheet by 10% or more.

In the electrical steel sheet having a practical depth of the nitrided layer of 0.07 mm or more and 0.14 mm or less, reduction in magnetic properties of the electrical steel sheet is further suppressed, and fatigue strength of the electrical steel sheet is improved by 30% or more. In particular, in such an electrical steel sheet, it is possible to suppress increases in iron losses ($W_{15/50}$ and $W_{10/400}$) of the electrical steel sheet to 1% or less and to improve fatigue strength of the electrical steel sheet by 30% or more.

In the electrical steel sheet 10C, the thickness of the electrical steel sheet at the end surface nitrided layer is preferably equal to or less than that at the base material part and is more preferably less than that at the base material part. Such an electrical steel sheet is suitable as an electrical steel sheet that is used in a laminated state.

The electrical steel sheet 10C of the fourth embodiment can employ the preferred embodiments described above in relation to the electrical steel sheets 10, 10A, and 10B of the first to the third embodiments, as desired.

Fifth Embodiment

Figure 6:
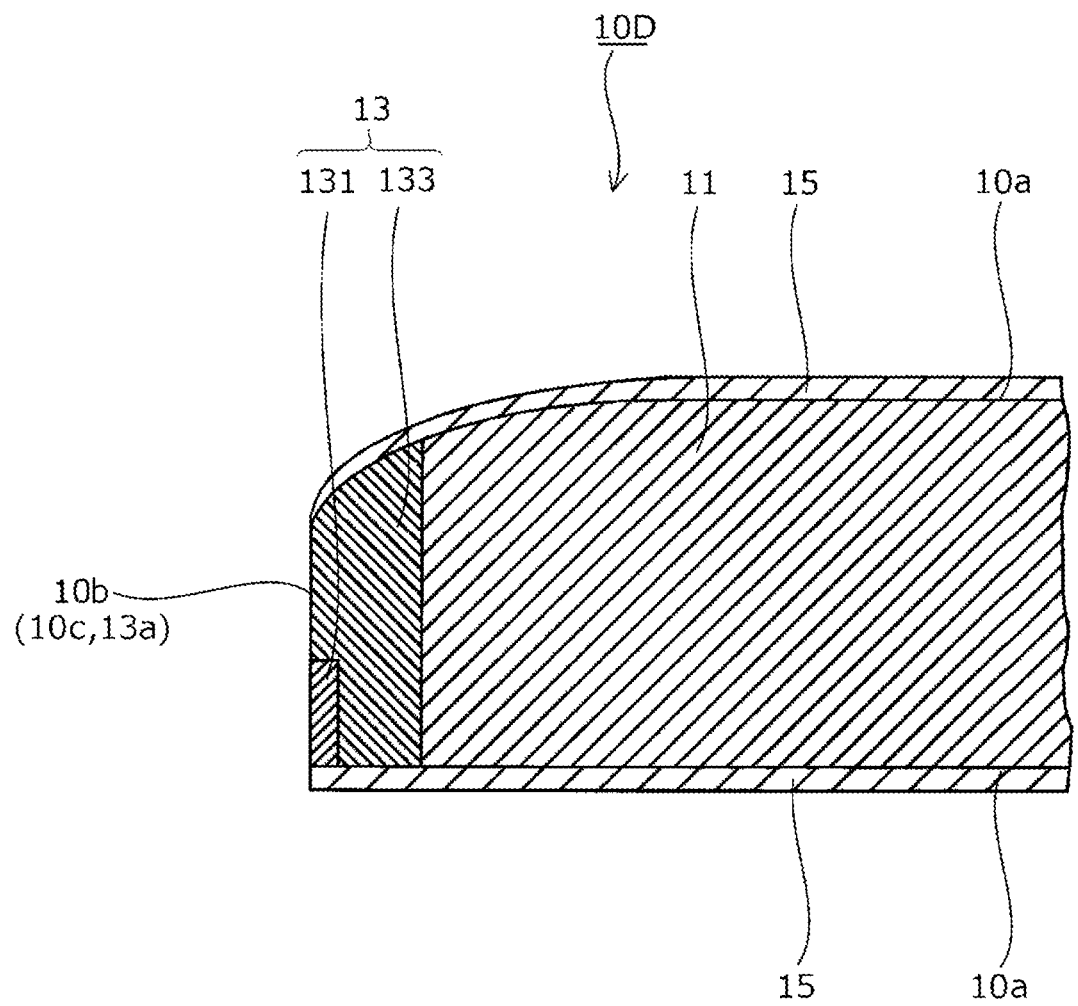
FIG. 6 is a schematic sectional view illustrating a main part of an electrical steel sheet according to a fifth embodiment.

Next, an electrical steel sheet according to a fifth embodiment will be described in detail. FIG. 6 is a schematic sectional view illustrating a main part of the electrical steel sheet according to the fifth embodiment. FIG. 6 is a schematic sectional view of the same part as the part shown by the line in FIG. 1, of the electrical steel sheet of the fifth embodiment. Note that constituent components equivalent to those described in the foregoing embodiments are denoted by the same reference signs, and descriptions thereof are omitted.

As illustrated in FIG. 6, an electrical steel sheet 10D of the fifth embodiment differs from the electrical steel sheet 10C of the fourth embodiment in that the end surface nitrided layer 13 includes a compound layer 131 and a diffusion layer 133 and that the ratio of the compound layer 131 on the surface 13a of the end surface nitrided layer 13 is 50% or less.

As described above, in the electrical steel sheet of the fifth embodiment, the end surface nitrided layer, which is provided on the end surface of the electrical steel sheet, has a surface hardness of 430 HV or more and 1250 HV or less. Thus, fatigue strength is improved by 10% or more without drastically reducing magnetic properties. The electrical steel sheet of the fifth embodiment has the end surface nitrided layer that includes a compound layer and a diffusion layer. In such an electrical steel sheet, reduction in magnetic properties is further suppressed, and fatigue strength is improved by 10% or more. In the electrical steel sheet of the fifth embodiment, the ratio of the compound layer on the surface of the end surface nitrided layer is 50% or less. In such an electrical steel sheet, reduction in magnetic properties of the electrical steel sheet is further suppressed, and fatigue strength of the electrical steel sheet is improved by 10% or more.

The electrical steel sheet 10D of the fifth embodiment can employ the preferred embodiments described above in relation to the electrical steel sheets 10, 10A, 10B, and 10C of the first to the fourth embodiments, as desired.

Sixth Embodiment

Figure 7:
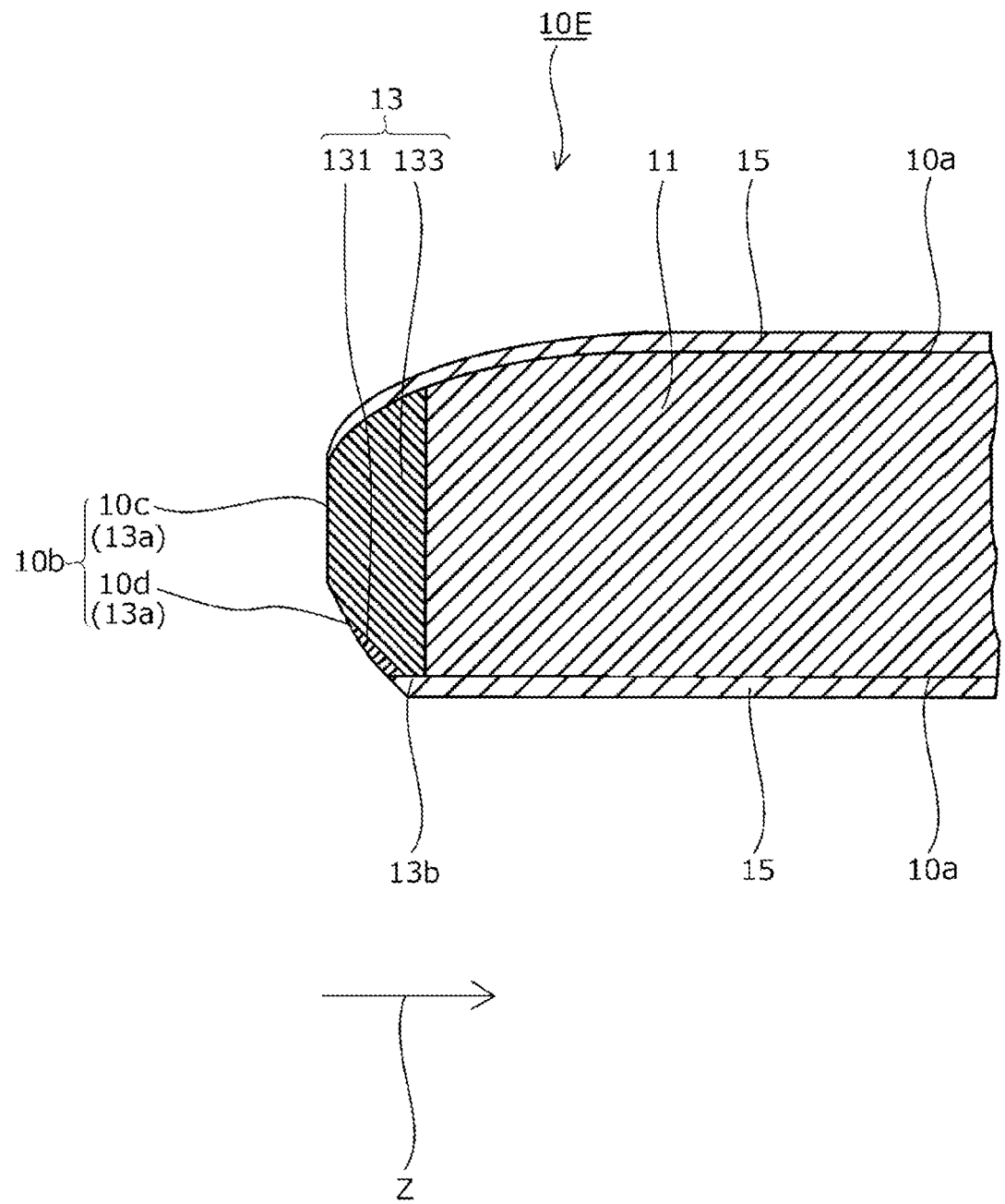
FIG. 7 is a schematic sectional view illustrating a main part of an electrical steel sheet according to a sixth embodiment.

Next, an electrical steel sheet according to a sixth embodiment will be described in detail. FIG. 7 is a schematic sectional view illustrating a main part of the electrical steel sheet according to the sixth embodiment. FIG. 7 is a schematic sectional view of the same part as the part shown by the line in FIG. 1, of the electrical steel sheet of the sixth embodiment. Note that constituent components equivalent to those described in the foregoing embodiments are denoted by the same reference signs, and descriptions thereof are omitted.

As illustrated in FIG. 7, an electrical steel sheet 10E of the sixth embodiment differs from the electrical steel sheet 10C of the fourth embodiment in that the end surface nitrided layer 13 includes a compound layer 131 and a diffusion layer 133, the end surface 10b includes a shear surface 10c and a fracture surface 10d, and the ratio of the compound layer 131 on the surface 13a of the end surface nitrided layer 13 is 50% or less.

As described above, in the electrical steel sheet of the sixth embodiment, the end surface nitrided layer, which is provided on the end surface of the electrical steel sheet, has a surface hardness of 430 HV or more and 1250 HV or less. Thus, fatigue strength is improved by 10% or more without drastically reducing magnetic properties. The electrical steel sheet of the sixth embodiment has the end surface nitrided layer that includes a compound layer and a diffusion layer. In such an electrical steel sheet, reduction in magnetic properties is further suppressed, and fatigue strength is improved by 10% or more. The electrical steel sheet of the sixth embodiment has the end surface that includes a shear surface and a fracture surface. In such an electrical steel sheet, reduction in magnetic properties is further suppressed, and fatigue strength is improved by 10% or more. In the electrical steel sheet of the sixth embodiment, the ratio of the compound layer on the surface of the end surface nitrided layer is 50% or less. In such an electrical steel sheet, reduction in magnetic properties of the electrical steel sheet is further suppressed, and fatigue strength of the electrical steel sheet is improved by 10% or more.

Further details of the fracture surface will be described.

As described above, the kind of the end surface 10b is not specifically limited, but for example, a cut end surface is preferable.

For example, the cut end surface is preferably a punched end surface that is produced by a pressing machine. The punched end surface usually includes a shear surface 10c and a fracture surface 10d. Such a punched end surface is preferable because it inhibits formation of a compound layer and suppresses diffusion of nitrogen, compared with a polished end surface.

In the electrical steel sheet 10E, a side surface 13b on the main surface 10a side of the electrical steel sheet 10E closer to the fracture surface 10d of the end surface nitrided layer 13, and the main surface 10a of the electrical steel sheet 10E, preferably form a flat surface.

In the electrical steel sheet having the flat surface, expansion and deformation of the electrical steel sheet due to gas nitrocaburizing or oxynitriding to the end surface of the electrical steel sheet are suppressed. Thus, reduction in magnetic properties of the electrical steel sheet is further suppressed, and fatigue strength of the electrical steel sheet is improved by 15% or more. Moreover, the dimensional accuracy of the electrical steel sheet is more reliably maintained.

The electrical steel sheet 10E of the sixth embodiment can employ the preferred embodiments described above in relation to the electrical steel sheets 10, 10A, 10B, 10C, and 10D of the first to the fifth embodiments, as desired.

Seventh Embodiment

Figure 8:
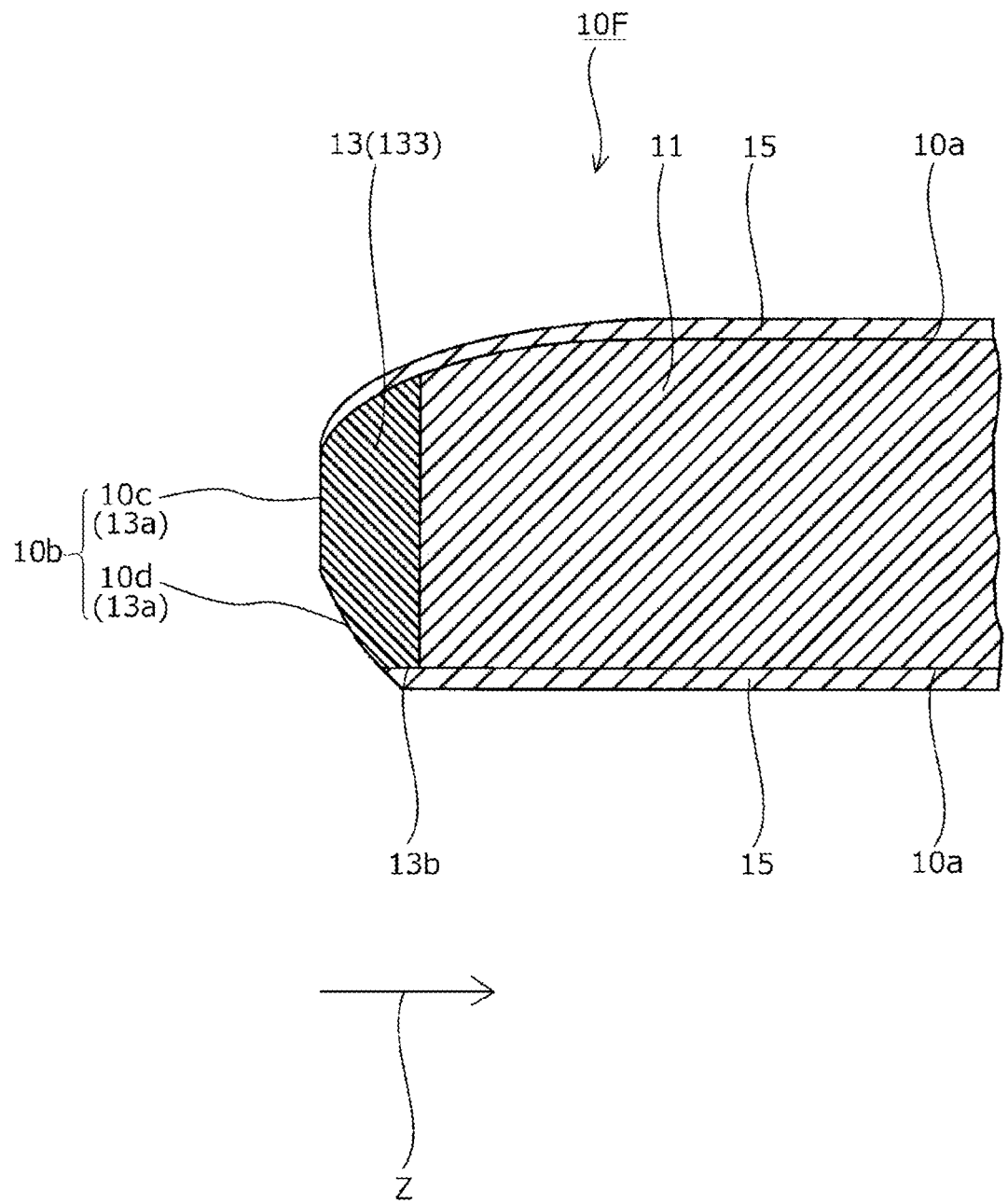
FIG. 8 is a schematic sectional view illustrating a main part of an electrical steel sheet according to a seventh embodiment.

Next, an electrical steel sheet according to a seventh embodiment will be described in detail. FIG. 8 is a schematic sectional view illustrating a main part of the electrical steel sheet according to the seventh embodiment. FIG. 8 is a schematic sectional view of the same part as the part shown by the II-II line in FIG. 1, of the electrical steel sheet of the seventh embodiment. Note that constituent components equivalent to those described in the foregoing embodiments are denoted by the same reference signs, and descriptions thereof are omitted.

As illustrated in FIG. 8, an electrical steel sheet 10F of the seventh embodiment differs from the electrical steel sheet 10C of the fourth embodiment in that the end surface 10b includes a shear surface 10c and a fracture surface 10d.

As described above, in the electrical steel sheet of the seventh embodiment, the end surface nitrided layer, which is provided on the end surface of the electrical steel sheet, has a surface hardness of 430 HV or more and 1250 HV or less. Thus, fatigue strength is improved by 10% or more without drastically reducing magnetic properties. The electrical steel sheet of the seventh embodiment has the end surface nitrided layer that is composed of a diffusion layer. In such an electrical steel sheet, reduction in magnetic properties is further suppressed, and fatigue strength is improved by 10% or more. The electrical steel sheet of the seventh embodiment has the end surface that includes a shear surface and a fracture surface. In such an electrical steel sheet, reduction in magnetic properties is further suppressed, and fatigue strength is improved by 10% or more.

The electrical steel sheet 10F of the seventh embodiment can employ the preferred embodiments described above in relation to the electrical steel sheets 10, 10A, 10B, 10C, and 10E of the first to the fourth and the sixth embodiments, as desired.

EXAMPLES

The present invention will be more further detailed with reference to examples hereinafter, but the present invention should not be limited to the examples described below.

Example 1

An electrical steel sheet (manufactured by Nippon Steel Corp., 25HX1400) was punched by using a pressing machine (press clearance: 0.06 mm), whereby a dumbbell test piece (width of an evaluation part: 25 mm, length of a parallel part of the evaluation part: 45 mm) was obtained.

Then, the obtained dumbbell test piece was subjected to gas nitrocaburizing (processing temperature: 540° C., processing time: 1 hour, used gas: $NH_3/CO_2$) using a pit nitriding furnace (processing furnace owned by Onex Corp., PNT-2), whereby an electrical steel sheet test piece of this example was prepared.

Example 2

The dumbbell test piece that was obtained in Example 1 was subjected to gas nitrocaburizing (processing temperature: 500° C., processing time: 2 hours, used gas: $NH_3/CO_2$) using a pit nitriding furnace (processing furnace owned by Onex Corp., PNT-2), whereby an electrical steel sheet test piece of this example was prepared.

Example 3

The dumbbell test piece that was obtained in Example 1 was subjected to gas nitrocaburizing (processing temperature: 500° C., processing time: 3 hours, used gas: $NH_3/CO_2$) using a pit nitriding furnace (processing furnace owned by Onex Corp., PNT-2), whereby an electrical steel sheet test piece of this example was prepared.

Example 4

The dumbbell test piece that was obtained in Example 1 was subjected to oxynitriding (processing temperature: 465° C., processing time: 3 hours, used gas: $NH_3$/air) using a pit nitriding furnace (processing furnace owned by Onex Corp., PN-3), whereby an electrical steel sheet test piece of this example was prepared.

Example 5

The dumbbell test piece that was obtained in Example 1 was subjected to oxynitriding (processing temperature: 465° C., processing time: 2 hours, used gas: $NH_3$/air) using a pit nitriding furnace (processing furnace owned by Onex Corp., PN-3), whereby an electrical steel sheet test piece of this example was prepared.

Example 6

The dumbbell test piece that was obtained in Example 1 was subjected to gas nitrocaburizing (processing temperature: 520° C., processing time: 1 hour, used gas: $NH_3/CO_2$) using a pit nitriding furnace (processing furnace owned by Onex Corp., PNT-2), whereby an electrical steel sheet test piece of this example was prepared.

Example 7

The dumbbell test piece that was obtained in Example 1 was subjected to gas nitrocaburizing (processing temperature: 520° C., processing time: 3 hours, used gas: $NH_3/CO_2$) using a pit nitriding furnace (processing furnace owned by Onex Corp., PNT-2), whereby an electrical steel sheet test piece of this example was prepared.

Example 8

An electrical steel sheet (manufactured by Nippon Steel Corp., 25HX1400) was cut by using a wire-cut electric discharge machine, whereby a dumbbell test piece (width of an evaluation part: 25 mm, length of a parallel part of the evaluation part: 45 mm) was obtained.

Then, the obtained dumbbell test piece was subjected to gas nitrocaburizing (processing temperature: 540° C., processing time: 1 hour, used gas: $NH_3/CO_2$) using a pit nitriding furnace (processing furnace owned by Onex Corp., PNT-2), whereby an electrical steel sheet test piece of this example was prepared.

Comparative Example 1

The dumbbell test piece that was obtained in Example 1 was used as an electrical steel sheet test piece of this example.

Comparative Example 2

The dumbbell test piece that was obtained in Example 1 was subjected to annealing (processing temperature: 750° C., processing time: 1 hour) using a pit nitriding furnace (processing furnace owned by Onex Corp., PV-3), whereby an electrical steel sheet test piece of this example was prepared.

Comparative Example 3

The dumbbell test piece that was obtained in Example 1 was subjected to gas nitrocaburizing (processing temperature: 540° C., processing time: 4.5 hours, used gas: $NH_3/CO_2$) using a pit nitriding furnace (processing furnace owned by Onex Corp., PNT-2), whereby an electrical steel sheet test piece of this example was prepared.

Comparative Example 4

The dumbbell test piece that was obtained in Example 8 was used as an electrical steel sheet test piece of this example.

Comparative Example 5

The dumbbell test piece that was obtained in Example 1 was subjected to annealing (processing temperature: 750° C., processing time: 1 hour) using a pit nitriding furnace (processing furnace owned by Onex Corp., PV-3). Then, it was subjected to gas nitrocaburizing (processing temperature: 500° C., processing time: 3 hours, used gas: $NH_3/CO_2$) using a pit nitriding furnace (processing furnace owned by Onex Corp., PNT-2). Thus, an electrical steel sheet test piece of this example was prepared.

Some of specifications of each of the examples are shown in Table 1.

TABLE 1

| | Surface Hardness of End Surface Nitrided Layer (X) (HV) | Hardness at Position of 40 μm Depth (Y) (HV) | X/Y × 100 (%) |
|---|---|---|---|
| Example 1 | 703 | 389 | 55.4 |
| Example 2 | 845 | 433 | 51.3 |
| Example 3 | 612 | 389 | 63.6 |
| Example 4 | 1065 | 436 | 41.0 |
| Example 5 | 437 | 362 | 82.8 |
| Example 6 | 579 | 424 | 73.2 |
| Example 7 | 912 | 559 | 61.3 |
| Example 8 | 1062 | — | — |
| Comparative Example 1 | 270 | — | — |
| Comparative Example 2 | 252 | — | — |
| Comparative Example 3 | 1276 | 692 | 93.5 |
| Comparative Example 4 | 230 | — | — |
| Comparative Example 5 | 240 | — | — |

| | Practical Depth of Nitrided Layer (Criterion: 300 HV) (—) | Existence of Compound Layer (—) |
|---|---|---|
| Example 1 | ND-HV0.025-P0.07 | Not observed |
| Example 2 | ND-HV0.025-P0.14 | Not observed |
| Example 3 | ND-HV0.025-P0.15 | Not observed |
| Example 4 | ND-HV0.025-P0.16 | Not observed |

TABLE 1-continued

| | | |
|---|---|---|
| Example 5 | ND-HV0.025-P0.07 | Not observed |
| Example 6 | ND-HV0.025-P0.09 | Not observed |
| Example 7 | ND-HV0.025-P0.11 | Not observed |
| Example 8 | — | Observed*[1] |
| Comparative Example 1 | — | Not observed |
| Comparative Example 2 | — | Not observed |
| Comparative Example 3 | ND-HV0.05-P0.11 | Observed*[2] |
| Comparative Example 4 | — | — |
| Comparative Example 5 | — | — |

| | Iron Loss Ratio | | | Fatigue Strength Stress Ratio | | Method of Processing |
|---|---|---|---|---|---|---|
| | ($W_{15/50}$) (—) | ($W_{10/400}$) (—) | Evaluation (—) | (—) | Evaluation (—) | Evaluation Part |
| Example 1 | 1.01 | 0.99 | A | 1.41 | A | Press Punching |
| Example 2 | 0.98 | 0.96 | A | 1.33 | A | Press Punching |
| Example 3 | 1.08 | 1.08 | B | 1.37 | A | Press Punching |
| Example 4 | 0.99 | 0.99 | A | 1.15 | B | Press Punching |
| Example 5 | 1.03 | 1.02 | B | 1.11 | C | Press Punching |
| Example 6 | 0.98 | 0.96 | A | 1.33 | A | Press Punching |
| Example 7 | 0.98 | 0.95 | A | 1.37 | A | Press Punching |
| Example 8 | *[3]— | *[3]— | — | 1.15 | — | Wire Cutting |
| Comparative Example 1 | 1 | 1 | — | 1 | — | Press Punching |
| Comparative Example 2 | *[4]— | *[4]— | — | 1.02 | D | Press Punching |
| Comparative Example 3 | 1.67 | 1.73 | C | 1.37 | A | Press Punching |
| Comparative Example 4 | — | — | — | 1.19 | — | Wire Cutting |
| Comparative Example 5 | — | — | — | 1.08 | D | Press Punching |

*[1])Ratio of compound layer on surface of end surface nitrided layer: 100%
*[2])Ratio of compound layer on surface of end surface nitrided layer: 50%
*[3])The iron loss ratio of Example 8 to Comparative Example 4 was not drastically increased.
*[4])The iron loss ratio of Example 2 to Comparative Example 1 was not drastically increased.

The "Surface Hardness of End Surface Nitrided Layer" in Table 1 was measured by using a micro-Vickers hardness tester No. 2 (manufactured by Future-Tech Corp., FM-700, measurement load: 25 gf) in conformity with Japanese Industrial Standards "Vickers hardness test—Test method" (JIS Z 2244). As to an electrical steel sheet test piece prepared by punching, this measurement was performed on the area of a shear surface.

The "Hardness at Position of 40 μm Depth" in Table 1 means hardness at a position of 40 μm depth from a surface of an end surface nitrided layer in a cross section along the depth direction of the end surface nitrided layer. The "Hardness at Position of 40 μm Depth" in Table 1 was measured in conformity with Japanese Industrial Standards "Vickers hardness test—Test method" (JIS Z 2244). In measuring the hardness in a cross section, the cross section was mirror polished. As to an electrical steel sheet test piece prepared by punching, this measurement was performed on the area of a shear surface.

The "Practical Depth of Nitrided Layer" in Table 1 was measured in conformity with Japanese Industrial Standards "Method of measuring nitrided case depth for iron and steel" (JIS G 0562). The "ND-HV0.025-P0.07" of Example 1 in Table 1 means that the Vickers hardness test was performed at a test load of 0.2452 N and the practical depth of the nitrided layer was 0.07 mm. The same applies to other examples. In addition, the hardness of the base material part as a criterion was 300 HV. As to an electrical steel sheet test piece prepared by punching, this measurement was performed on the area of a shear surface.

The "Existence of Compound Layer" in Table 1 was determined as follows: A cross section along the thickness direction of the electrical steel sheet test piece was observed with the use of a scanning electron microscope (manufactured by Hitachi High-Technologies Corp., FlexSEM 1000) and was then analyzed for elements in energy dispersive X-ray spectroscopy. Prior to observation of a cross section, the cross section was etched for 3 to 10 minutes by using an etching solution of a mixture of nitric acid and ethanol in a volume ratio of 0.5:9.5, in conformity with Japanese Industrial Standards "Steel—Macroscopic examination by etching" (JIS G 0553).

[Evaluation] Magnetic properties and fatigue strength of each of the examples were measured.

(Magnetic Properties)

Iron loss of the electrical steel sheet test piece of each of the examples was measured by using an Epstein iron loss measurement device (manufactured by Metron Giken Co., Ltd., SK300), in conformity with Japanese Industrial Standards "Test methods for electrical steel strip and sheet" (JIS C 2550-1). The obtained results are shown in Table 1. The "Iron Loss Ratio ($W_{15/50}$)" of each example in Table 1 means a ratio of an iron loss ($W_{15/50}$) of each example to an iron loss ($W_{15/50}$) of Comparative Example 1. The "Iron Loss Ratio ($W_{10/400}$)" of each example in Table 1 means a ratio of an iron loss ($W_{10/400}$) of each example to an iron loss ($W_{10/400}$) of Comparative Example 1.

(Fatigue Strength)

Fatigue strength of the electrical steel sheet test piece of each of the examples was measured by applying a partial pulsating input with the use of a low-load hydraulic servo fatigue testing machine (manufactured by SUM Electro Mechanics Co., Ltd., V691), in conformity with Japanese Industrial Standards "General rules for fatigue testing of metals" (JIS Z 2273). The obtained results are shown in Table 1. The "Fatigue Strength Stress Ratio" of each example (except for Example 8) in Table 1 means a ratio of a fatigue strength stress of each example to a fatigue strength stress of Comparative Example 1. The "Fatigue Strength Stress Ratio" of Example 8 in Table 1 means a ratio of a fatigue strength stress of Example 8 to a fatigue strength stress of Comparative Example 4.

Table 1 shows that each of the electrical steel sheets of Examples 1 to 7 belonging to the scope of the present invention had a surface hardness of 430 HV or more and 1250 HV or less at the end surface nitrided layer provided on the end surface of the electrical steel sheet. Thus, compared with Comparative Examples 1 to 3 that do not fall within the scope of the present invention, Examples 1 to 7 belonging to the scope of the present invention were improved in fatigue strength by 10% or more without drastically reducing magnetic properties.

Table 1 shows that the electrical steel sheet of Example 8 belonging to the scope of the present invention had a surface hardness of 430 HV or more and 1250 HV or less at the end surface nitrided layer provided on the end surface of the electrical steel sheet. Thus, compared with Comparative Example 4 that does not fall within the scope of the present invention, Example 8 belonging to the scope of the present invention was improved in fatigue strength by 10% or more without drastically reducing magnetic properties.

Table 1 shows that each of Examples 1 to 8 belonging to the scope of the present invention had a nitrogen concentration higher at the end surface than at the main surface. Thus, compared with Comparative Examples 1 and 2 that do not fall within the scope of the present invention, Examples 1 to 8 belonging to the scope of the present invention were improved in fatigue strength by 10% or more without drastically reducing magnetic properties.

Table 1 shows that, in each of Examples 1 to 4, 6, and 7 belonging to the scope of the present invention, the ratio of the hardness at the position of 40 μm depth from the surface of the end surface nitrided layer in a cross section along the depth direction of the end surface nitrided layer, to the surface hardness of the end surface nitrided layer, is 80% or less. This further suppressed reduction in magnetic properties and improved fatigue strength of the electrical steel sheets by 15% or more in Examples 1 to 4, 6, and 7 belonging to the scope of the present invention, compared with Example 5.

Table 1 shows that each of Examples 1 to 4, 6, and 7 belonging to the scope of the present invention had a surface hardness of 550 HV or more at the end surface nitrided layer. Thus, compared with Example 5, in each of Examples 1 to 4, 6, and 7 belonging to the scope of the present invention, reduction in magnetic properties was further suppressed, and fatigue strength of the electrical steel sheet was improved by 15% or more.

Table 1 also shows that, each of Examples 1 to 7 belonging to the scope of the present invention was improved in fatigue strength by 10% or more without drastically reducing magnetic properties because the practical depth of the nitrided layer was 0.07 mm or more.

Table 1 shows that Example 8 belonging to the scope of the present invention had an end surface nitrided layer that included a compound layer and a diffusion layer. This further suppressed reduction in magnetic properties and improved fatigue strength of the electrical steel sheet by 15% or more in Example 8 belonging to the scope of the present invention, compared with Comparative Example 4.

Table 1 shows that each of Examples 1 to 7 belonging to the scope of the present invention had an end surface nitrided layer that was composed of a diffusion layer. Thus, compared with Comparative Example 3 that does not fall within the scope of the present invention, Examples 1 to 7 belonging to the scope of the present invention were improved in fatigue strength by 10% or more without drastically reducing magnetic properties.

In each of Examples 1 to 8 belonging to the scope of the present invention, the thickness of the electrical steel sheet at the end surface nitrided layer is equal to or less than that at the base material part and is more preferably less than that at the base material part. In view of this, Examples 1 to 8 belonging to the scope of the present invention are suitable as electrical steel sheets that are used in a laminated state.

From another point of view, Examples 1 to 7 belonging to the scope of the present invention were improved in fatigue strength by 10% or more without drastically reducing magnetic properties because of having at least a shear surface or having a shear surface and a fracture surface.

From yet another point of view, Examples 1, 2, and 4 to 7 belonging to the scope of the present invention were improved in fatigue strength by 10% or more without drastically reducing magnetic properties, because a shear surface and a fracture surface were included, and a side surface of the end surface nitrided layer on a main surface side of the electrical steel sheet closer to the fracture surface, and the main surface, formed a flat surface.

Comparing Example 3 belonging to the scope of the present invention with Comparative Example 5 that does not fall within the scope of the present invention, the process of gas nitrocaburizing after annealing did not provide an effect of improving fatigue strength by 10% or more without drastically reducing magnetic properties.

The constituent components described for the electrical steel sheet in each of the foregoing embodiments should not be limited to those in the corresponding embodiment. For example, the combination of the constituent components of each embodiment can be a combination other than that in each embodiment, and details of the constituent components in each embodiment can be altered or modified.

REFERENCE SIGNS LIST

10, 10A, 10B, 10C, 10D, 10E, 10F Electrical steel sheet
10a Main surface
10b End surface
10c Shear surface
10d Fracture surface
11 Base material part
13 End surface nitrided layer
13a Surface
13b Side surface
131 Compound layer
133 Diffusion layer
15 Insulating film

The invention claimed is:

1. An electrical steel sheet comprising:
a base material part having a main surface and an end surface; and
an end surface nitrided layer provided on the end surface of the base material part in a manner adjacent to the base material part and containing nitrogen, wherein:
the end surface nitrided layer has a surface hardness of 430 HV or more and 1250 HV or less,
an entirety of the end surface nitrided layer that covers the end surface of the base material part contains nitrogen,
an end surface of the end surface nitrided layer includes a shear surface and a fracture surface, and
a side surface of the end surface nitrided layer on a side closer to the fracture surface, and the main surface of the base material part, form a flat surface.

2. An electrical steel sheet comprising:
a base material part that has a main surface and an end surface and is positioned on a center side of a plane direction of the main surface, wherein, in a thickness direction of the electrical steel sheet, an entirety of the base material part does not include a nitrided layer; and
an end surface nitrided layer provided on an entirety of the end surface of the base material part in a manner adjacent to the base material part, wherein, in the thickness direction of the electrical steel sheet, an entirety of the end surface nitrided layer contains nitrogen,
the end surface nitrided layer having a surface hardness of 430 HV or more and 1250 HV or less.

3. The electrical steel sheet according to claim 1, wherein a nitrogen concentration at the end surface of the end surface nitrided layer is higher than a nitrogen concentration at the main surface.

4. The electrical steel sheet according to claim 1, wherein a ratio of a hardness at a position of 40 μm depth from the end surface of the end surface nitrided layer in a depth direction of the end surface nitrided layer, to a surface hardness of the end surface nitrided layer, is 80% or less.

5. The electrical steel sheet according to claim 1, wherein the end surface nitrided layer has a surface hardness of 550 HV or more and 1250 HV or less.

6. The electrical steel sheet according to claim 1, wherein a distance from the end surface of the end surface nitrided layer to a point having a Vickers hardness higher than a Vickers hardness of the base material part by 50 in a depth direction of the end surface nitrided layer, is 0.07 mm or longer.

7. The electrical steel sheet according to claim 1, wherein the end surface nitrided layer includes a compound layer and a diffusion layer.

8. The electrical steel sheet according to claim 7, wherein a ratio of an area of the compound layer to an area of the diffusion layer at the end surface of the end surface nitrided layer is 50% or less.

9. The electrical steel sheet according to claim 1, wherein the end surface nitrided layer is composed entirely of a diffusion layer.

10. The electrical steel sheet according to claim 1, wherein a thickness of the electrical steel sheet at the end surface nitrided layer is smaller than a thickness of the electrical steel sheet at the base material part.

11. The electrical steel sheet according to claim 1, wherein the base material part of the electrical steel sheet has a composition of 2.0 mass % or more and 4.0 mass % or less of Si, 0.15 mass % or more and 2.00 mass % or less of Al, 0.10 mass % or more and 2.00 mass % or less of Mn, 0.01 mass % or more and 3.0 mass % or less of Ni, and the balance of Fe and inevitable impurities.

12. The electrical steel sheet according to claim 1, wherein:
    a ratio of a hardness at a position of 40 µm depth from the end surface of the end surface nitrided layer in a depth direction of the end surface nitrided layer, to a surface hardness of the end surface nitrided layer, is 80% or less, and
    a distance from the end surface of the end surface nitrided layer to a point having a Vickers hardness higher than the Vickers hardness of the base material part by 50 in a depth direction of the end surface nitrided layer, is 0.07 mm or longer and 0.15 mm or shorter.

13. The electrical steel sheet according to claim 1, wherein:
    a ratio of a hardness at a position of 40 µm depth from the end surface of the end surface nitrided layer in a depth direction of the end surface nitrided layer, to a surface hardness of the end surface nitrided layer, is 80% or less, and
    a distance from the end surface of the end surface nitrided layer to a point having a Vickers hardness higher than the Vickers hardness of the base material part by 50 in a depth direction of the end surface nitrided layer, is 0.07 mm or longer and 0.14 mm or shorter.

14. The electrical steel sheet according to claim 2, wherein a nitrogen concentration at an end surface of the end surface nitrided layer is higher than a nitrogen concentration at the main surface.

15. The electrical steel sheet according to claim 2, wherein a ratio of a hardness at a position of 40 µm depth from an end surface of the end surface nitrided layer in a depth direction of the end surface nitrided layer, to a surface hardness of the end surface nitrided layer, is 80% or less.

16. The electrical steel sheet according to claim 2, wherein the end surface nitrided layer has a surface hardness of 550 HV or more and 1250 HV or less.

17. The electrical steel sheet according to claim 2, wherein a distance from an end surface of the end surface nitrided layer to a point having a Vickers hardness higher than a Vickers hardness of the base material part by 50 in a depth direction of the end surface nitrided layer, is 0.07 mm or longer.

18. The electrical steel sheet according to claim 2, wherein the end surface nitrided layer includes a compound layer and a diffusion layer.

19. The electrical steel sheet according to claim 2, wherein a thickness of the electrical steel sheet at the end surface nitrided layer is equal to or smaller than a thickness of the electrical steel sheet at the base material part.

20. The electrical steel sheet according to claim 2, wherein the base material part of the electrical steel sheet has a composition of 2.0 mass % or more and 4.0 mass % or less of Si, 0.15 mass % or more and 2.00 mass % or less of Al, 0.10 mass % or more and 2.00 mass % or less of Mn, 0.01 mass % or more and 3.0 mass % or less of Ni, and the balance of Fe and inevitable impurities.

* * * * *